United States Patent [19]

Cason, III et al.

[11] 4,239,341
[45] Dec. 16, 1980

[54] UNSTABLE OPTICAL RESONATORS WITH TILTED SPHERICAL MIRRORS

[75] Inventors: Charles M. Cason, III; James F. Perkins; Robert W. Jones, all of Huntsville, Ala.

[73] Assignee: The United States of America as represented by the Secretary of the Army, Washington, D.C.

[21] Appl. No.: 956,137

[22] Filed: Oct. 30, 1978

[51] Int. Cl.³ ............................................. H01S 3/083
[52] U.S. Cl. .................................. 350/294; 331/94.5 C
[58] Field of Search ................... 331/94.5 C; 350/288, 350/294

[56] References Cited

U.S. PATENT DOCUMENTS

| 3,824,487 | 7/1974 | Buczek et al. | 331/94.5 C |
| 4,156,852 | 5/1979 | Hagen | 331/94.5 C |

OTHER PUBLICATIONS

Siegman, Unstable Optical Resonators for Laser Applications, Proc. IEEE, vol. 53, (1965), 277.
Siegman, Unstable Optical Resonators, Appl. Optics, vol. 13, (1974), 353.
Kogelnik et al., Astigmatically Compensated Cavities for CW Dye Lasers, IEEE, J. Quant. Electr., QE-8, (1972), 373.
Johnston et al., An Improved Astigmatically Compensated Resonator for CW Dye Lasers, IEEE, J. Quant. Electr., QE-8, (1972), 724.
Dunn et al., Coma Compensation in Off-Axis Laser Resonator, Optics Commun., vol. 20, (1977), 214.

*Primary Examiner*—William L. Sikes
*Attorney, Agent, or Firm*—Nathan Edelberg; Robert P. Gibson; James T. Deaton

[57] ABSTRACT

Tilted spherical mirrors are used as a means of achieving asymmetric magnification ($M_x \neq M_y$) in collimated-output unstable resonators which obviate fabrication difficulties associated with non-spherical mirrors. By suitable choice of rather large tilt angles of spherical mirrors and mirror separation, simultaneous "confocality" can be achieved in x-z and y-z planes to the lowest order.

7 Claims, 6 Drawing Figures

UNSTABLE OPTICAL RESONATORS WITH TILTED SPHERICAL MIRRORS

DEDICATORY CLAUSE

The invention described herein may be manufactured, used, and licensed by or for the Government for Governmental purposes without the payment to us of any royalties thereon.

BACKGROUND OF THE INVENTION

For certain applications in chemical lasers, there is a need for optical resonators which have different magnifications (and other properties) along orthogonal (x and y) axes perpendicular to the propagation direction. For example, there is such a need in connection with high-energy chemical lasers in which the gain region is much shorter along the x-axis (flow direction) than along the y-axis. Such asymmetric-magnification resonators may be constructed with non-spherical mirrors, but acceptable non-spherical mirrors are much more difficult to fabricate than mirrors with a spherical configuration. Also, the use of spherical mirrors in conventional orientation such as in the confocal unstable resonator, requires the mirror normal to be along (or nearly parallel to) the propagation direction. A resonator of this type has larger diffraction spillage losses in the short or x direction. Therefore, there is a need for an optical resonator with simple mirror arrangements which overcome difficulties encountered in previous resonator schemes.

Accordingly, it is an object of this invention to provide tilted spherical mirror resonator arrangements which have means for varying the resonator mode volume and asymmetric magnification in a continuous fashion to match the chemical gain medium and thereby maximize laser extraction efficiency.

Another object of this invention, is to provide asymmetric-magnification resonators which are fabricated using spherical mirrors and roof top mirrors and avoiding non-spherical mirror arrangements. A further object of this invention is to provide spherical-mirror resonators which achieve desired asymmetric-magnification by utilizing configurations such that the normal to the spherical-mirror surfaces are rotated through rather large angles with respect to conventional orientation in which mirror normals are parallel or substantially parallel to the propagation direction.

A still further object of this invention is to provide a ring resonator that utilizes tilted spherical-mirror surfaces.

Other objects and advantages of this invention will be obvious to those skilled in this art.

SUMMARY OF THE INVENTION

In accordance with this invention, resonators are provided that utilize spherical-mirror surfaces that are tilted at substantial angles and utilized in an arrangement such that they have phase mixing across center line axis per each round trip, or asymmetric magnification without phase mixing. These arrangements allow asymmetric $M_x$ and $M_y$ in orthogonal directions perpendicular to the propagation direction by utilizing a standing wave arrangement or a traveling wave arrangement.

DESCRIPTION OF THE PREFERRED EMBODIMENT

Figure 1:
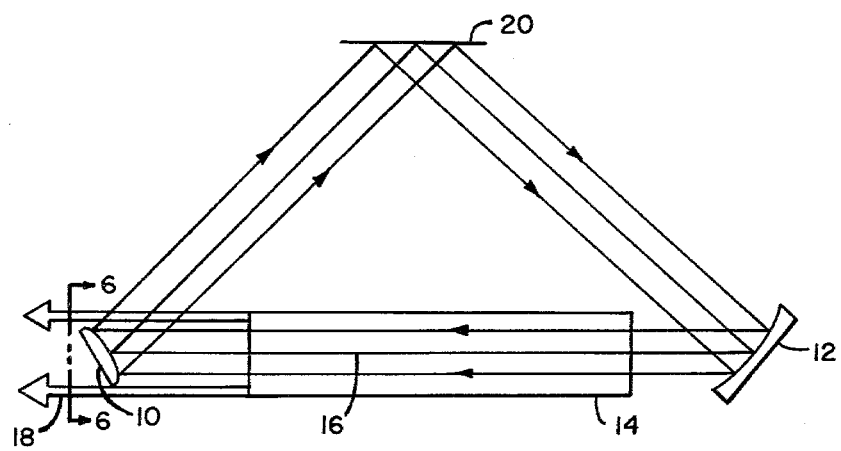
FIG. 1 is a traveling wave tilted spherical mirror ring resonator in accordance with this invention.
Figure 6:
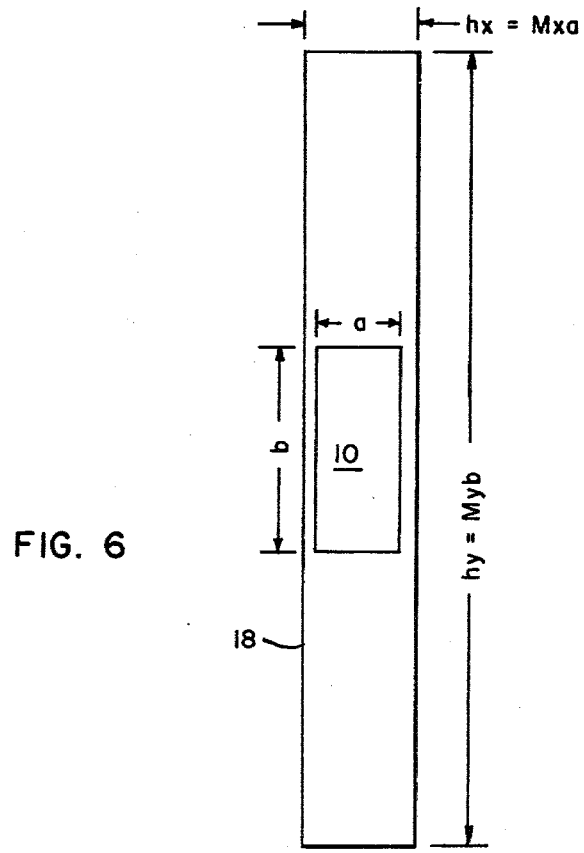
FIG. 6 is an enlarged view looking in the direction of line 6—6 of FIG. 1.

Referring now to the drawings, FIG. 1 illustrates a traveling wave resonator in accordance with this invention which includes spherical mirrors 10 and 12 which are mounted on opposite sides of laser cavity 14 that has a laser medium with gain generated therein about a center line axis or optical axis 16 of the laser medium. Spherical mirrors 10 and 12 are each tilted a substantial angle of about 10 degrees to about 70 degrees relative to center line axis or optical axis 16 to produce the desired asymmetric magnification ($M_x \neq M_y$) output 18 when mirror means such as mirror flat 20 is provided for completing the optical path of the traveling wave resonator. In this resonator, with spherical mirrors 10 and 12 tilted relative to the center line axis or optical axis 16 and with flat mirror 20 for returning the reflected laser beam, phase mixing across the center line axis or across axis 16 is accomplished per round trip around the traveling wave resonator as illustrated. Laser chamber 14 is a conventional type laser chamber with a conventional type chemical laser output in which it is desired to obtain an asymmetric magnification output therefrom. Output 18 of this resonator has a generally rectangular shape as illustrated in FIG. 6 in which $h_x$ has a much shorter dimension than dimension $h_y$. The shadow of mirror 10 is illustrated at the center of FIG. 6.

Figure 2:
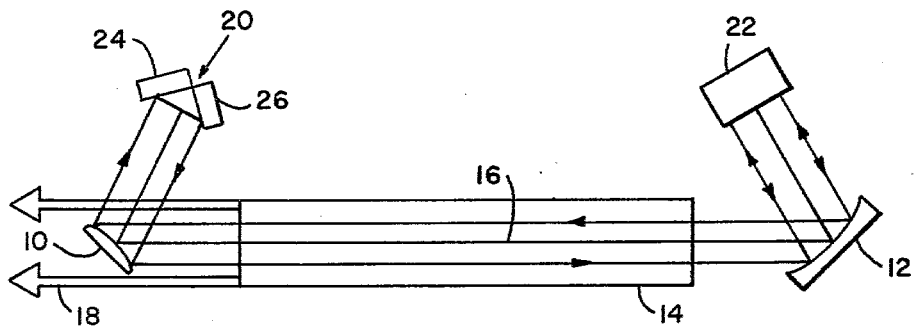
FIG. 2 is a standing wave tilted spherical mirror resonator in accordance with this invention.

Referring now to FIG. 2, another embodiment of this invention is illustrated and includes elements 10, 12, 14, 16, and 18 that are the same as those of FIG. 1, but in this embodiment a standing wave tilted spherical resonator results by using roof top mirrors 20 and 22 for reflecting the laser beam back on itself in a standing wave fashion. Mirrors 24 and 26 of roof top 20 have the reflective surfaces located 90° apart to reflect the beam back and mirror 22 likewise has similar surfaces to that of mirror 20 with mirror 22 being rotated 90° from that of mirror 20 to cause phase mixing across the center line axis or optical axis 16 similar to that of FIG 1. If phase mixing across the center line axis is not required or desired, plain flat mirrors can be substituted for roof top mirrors 20 and 22 and still produce asymmetric magnification at output 18.

Figure 3:
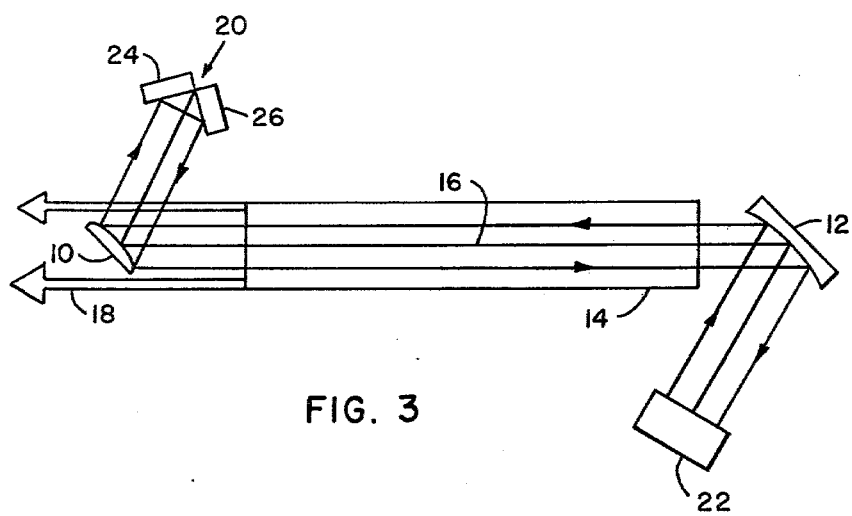
FIG. 3 is another embodiment of a standing wave tilted spherical mirror resonator in accordance with this invention.

Referring now to FIG. 3, another embodiment of this invention is illustrated in which items 10, 12, 14, 16, and 18 are the same as those in FIG. 2, but with spherical mirror 12 tilted in an opposite direction to form a Z type configuration. In this type arrangement, mirrors 20 and 22 can be of the roof top as illustrated with the structure as defined for FIG. 2 herein above or these mirrors likewise can be plain flat mirrors if phase mixing across the center line per round trip is not desired.

As can be seen, in operation, each of the embodiments illustrated in FIGS. 1 through 3 produce an asymmetric magnification output 18 from laser cavity 14 with the magnification having phase mixing across the center line axis when a traveling wave arrangement is provided as illustrated in FIG. 1 or when roof top mirrors are used for the mirror means in the arrangements illustrated in FIGS. 2 and 3. Phase mixing has two advantages for these tilted spherical mirror resonators: first, the effects of laser active medium inhomogeneities are minimized, and, secondly, it reduces the small inherent aberrations produced solely by the tilted spherical mirrors.

A theoretical and experimental analysis relative to the tilting of the spherical mirrors and the differential magnification is set forth herein below. With the advent of chemical lasers of rectangular geometry, a need arose for resonators with magnification $M_x$ in the shorter (flow) dimension which was substantially smaller than the magnification $M_y$ in the other transverse dimension. Applicants achieve the desired asymmetric magnification property with spherical mirrors by tilting the mirrors at substantial angles. In accomplishing this, applicants first carried out a low-order theoretical analysis which ignored aberrations, then an experimental examination. Assuming aberrations to be suitably controlled, this invention has the further advantage of adjustability or of experimental flexibility in that different combinations of magnification $M_x$ and $M_y$ can be obtained with one set of tilted mirrors. This is accomplished by adjustably tilting the spherical mirrors relative to each other and adjusting the separation between the spherical mirrors for given tilt angles.

Figure 4:
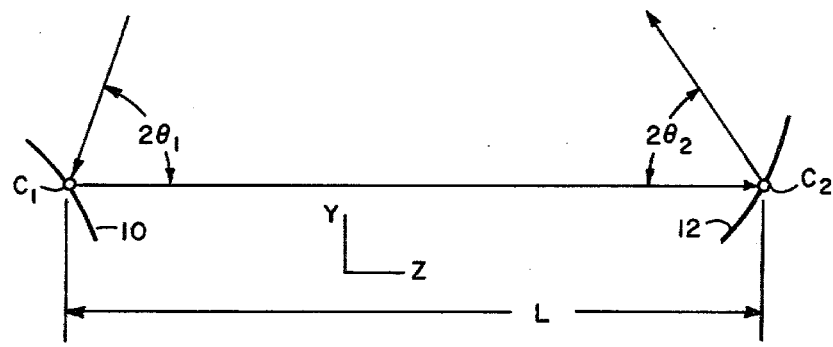
FIG. 4 is a schematic illustration with tilted spherical mirrors illustrated in the opposite sense and with reflection of a collimated beam.
Figure 5:
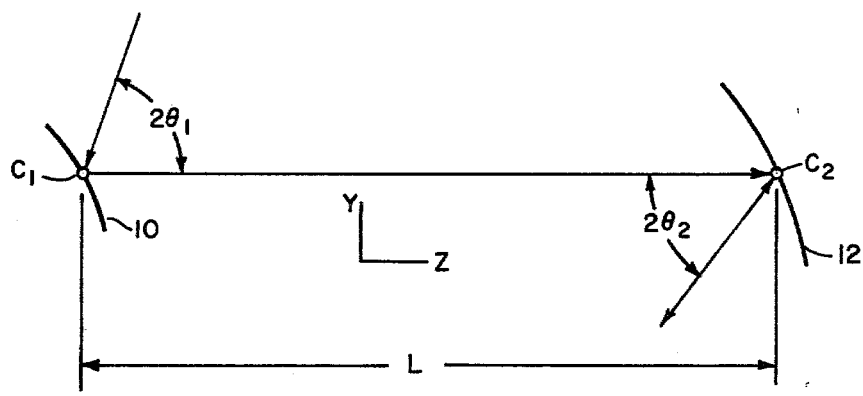
FIG. 5 is a schematic illustration with tilt angles in the same sense of the mirrors and illustrate a collimated beam reflection relative to the spherical mirrors.

Referring now to FIGS. 4 and 5, two spherical mirrors 10 and 12 are tilted at substantial angles in the y-z plane. It is known that the effective focal lengths of tilted spherical mirrors are $$F_y(\theta) = (R/2) \cos \theta, \tag{1}$$

$$F_x(\theta) = (R/2) \sec \theta, \tag{2}$$

where $\theta$ is the angle between incident beam and mirror normal (bending angle is 2$\theta$).

For purposes of discussion it is sufficient to limit attention to the portion of the resonator in which a collimated beam is incident on convex mirror 10 at an angle $\theta_1$ (See FIG. 4). The beam expands (by different amounts along x and y transverse dimensions) and strikes concave mirror 12 located a distance L away at an angle $\theta_2$ such that the beam emerging from the second mirror is again collimated. There are two choices for the relative senses of angles $\theta_1$ and $\theta_2$, as illustrated in FIGS. 4 and 5. The following design equations are the same for the two relative senses of tilt (but the aberrations are less in the arrangement of FIG. 5. It is necessary to complete the optical path to produce a resonator. This is accomplished in either a ring-resonator fashion as illustrated in FIG. 1 or by returning the beam on itself in standing-wave fashion as illustrated in FIGS. 2 and 3. The following analysis is most directly applicable to the ring-resonator case of FIG. 1. It is also applicable to the standing-wave case of FIGS. 2 and 3 if distances between spherical mirrors and associated turning flats are small in comparison to spherical mirror separation. A factor of two reduction in effective focal lengths is included to allow for double reflection from each spherical mirror in the standing-wave case. A large distance between the turning flats and the associated spherical-mirrors allows useful changes to be made in the resonator geometric output coupling.

The basic confocality equations are:

$$R_1 \cos \theta_1 + R_2 \cos \theta_2 = 2L, \tag{3}$$

$$R_1 \sec \theta_1 + R_2 \sec \theta_2 = 2L, \tag{4}$$

where $R_1 + R_2$ are the radii of curvature of spherical mirrors 10 and 12. The associated magnifications are given by $$M_y = -\frac{R_2 \cos \theta_2}{R_1 \cos \theta_1}, \tag{5}$$

$$M_x = -\frac{R_2 \sec \theta_2}{R_1 \sec \theta_1}. \tag{6}$$

For comparison, the magnification M of a conventional untilted resonator is given by $$M = -\frac{R_2}{R_1}. \tag{7}$$

If $M_x$ and $M_y$ are considered as given quantities, the following equations are obtained:

$$\cos \theta_1 = \sqrt{\frac{(M_x - 1)}{(M_y - 1)}}, \tag{8}$$

$$\cos \theta_2 = \sqrt{\frac{M_y(M_x - 1)}{M_x(M_y - 1)}} = \sqrt{\frac{M_y}{M_x}} \cos \theta_1. \tag{9}$$

It is noted that the product of the two magnifications is independent of tilt i.e., $$M_x M_y = M^2. \tag{10}$$

Thus, the geometric outcoupling fraction is independent of tilt and is the same as for a conventional resonator.

For a given pair of spherical mirrors, $R_1$ and $R_2$ (and hence M) are known. If $\theta_1$ is then considered an independent variable, one can obtain the value of $M_x$ from $$M_x = \frac{[1 - \cos^2(\theta_1)] + \sqrt{[1 - \cos^2(\theta_1)]^2 + 4M^2 \cos^2(\theta_1)}}{2}. \tag{11}$$

The value of $M_y$ is then determined by Eq. (10). The magnitude of the appropriate value of $\theta_2$ is then given by Eq. (9), while the separation L is determined from either Eq. (3) or Eq. (4).

Table I herein below presents values of angles, magnifications, and mirror separations for a pair of resonator mirrors which were used in experimental studies. Note that the required mirror separation L is reduced only moderately by the effects of tilt and that $\theta_2$ is somewhat less than $\theta_1$.

Experiments were carried out for a range of tilt angles $\theta_1$ up to 70 deg and included both types of arrangements indicated in FIGS. 4 and 5. Required mirror separations L and values of $\theta_2$ for specified $\theta_1$ are in agreement with the predictions.

TABLE I

Predicted Values of $\theta_2$, $M_x$, $M_y$, and L and Measured Values of $\theta_2$, $M_y/M_x$ of a Collimated Output-Beam Tilted Spherical-Mirror Resonator for Several Values of $\theta_1$.

| Theory | | | | | Experiment | |
|---|---|---|---|---|---|---|
| $\theta_1$ (deg) | $\theta_2$ (deg) | $M_x$ | $M_y$ | L (cm) | $\theta_2$ (deg) | $M_y/M_x$ |
| 0 | 0 | 2.3276 | 2.3276 | 192.50 | | |
| 10 | 6.56 | 2.3073 | 2.3480 | 192.49 | | |
| 20 | 13.19 | 2.2465 | 2.4116 | 192.34 | | |
| 30 | 19.96 | 2.1446 | 2.5261 | 191.64 | 20.0 | |
| 45 | 30.73 | 1.9147 | 2.8294 | 187.57 | 30.5 | 1.44 |
| 50 | 34.62 | 1.8180 | 2.9799 | 184.54 | 34.4 | 1.63 |
| 55 | 38.76 | 1.7121 | 3.1644 | 180.01 | 38.4 | 1.89 |
| 60 | 43.25 | 1.5977 | 3.3909 | 173.34 | 43.1 | 2.17 |
| 65 | 48.23 | 1.4767 | 3.6688 | 163.55 | | |
| 70 | 53.92 | 1.3518 | 4.0076 | 149.16 | 53.2 | 2.93 |

NOTE:
Mirror curvatures are taken to be $R_1 = -290$ cm, $R_2 = 675$ cm.
The geometric mean of $M_x$ and $M_y$ is the ordinary magnification $M = 2.3276$. The measured values were found by minimizing the shearing interferometric fringe pattern by adjusting $\theta_2$.

We claim:

1. A collimated-output unstable resonator comprising a pair of spherical mirrors tilted at substantial angles of about 10° to about 70° relative to an axis therebetween and separated a predetermined distance, one of said spherical mirrors having a smaller reflective dimension than that of the other and having a generally rectangular peripheral shape, and mirror means mounted relative to said spherical mirrors so as to complete a continuous optical path with said mirrors to establish a continuous feedback path, and said spherical mirrors being shaped and tilted sufficiently relative to each other to cause an asymmetric magnification collimated-output in x and y directions to be produced in a generally rectangular shape at said one of said spherical mirrors.

2. A collimated-output unstable resonator as set forth in claim 1, wherein said mirror means is arranged as a ring-resonator with said spherical mirrors to cause phase mixing across said axis therebetween per round trip.

3. A collimated-output unstable resonator as set forth in claim 1, wherein said mirror means include an arrangement for returning a beam from the spherical mirrors on itself in a standing-wave.

4. A collimated-output unstable resonator as set forth in claim 1, wherein said mirror means includes mirrors on opposite sides of said spherical mirrors and arranged for returning a beam from the spherical mirrors on itself in a standing-wave.

5. A collimated-output unstable resonator as set forth in claim 4, wherein said mirrors on opposite sides of said spherical mirrors are roof top mirrors to cause phase mixing across said axis therebetween per round trip.

6. A collimated-output unstable resonator as set forth in claim 1, wherein said mirror means includes mirrors on one side of said spherical mirrors and arranged for returning a beam from the spherical mirrors on itself in a standing-wave.

7. A collimated-output unstable resonator as set forth in claim 6, wherein said mirrors on said one side of said spherical mirrors are roof top mirrors to cause phase mixing across said axis therebetween per round trip.

* * * * *